United States Patent
Yu et al.

(10) Patent No.: US 10,511,484 B1
(45) Date of Patent: Dec. 17, 2019

(54) MEMBERSHIP SELF-DISCOVERY IN DISTRIBUTED COMPUTING ENVIRONMENTS

(71) Applicant: Amazon Technologies, Inc., Seattle, WA (US)

(72) Inventors: Wei Yu, Sammamish, WA (US); Dmytro Ivashchenko, Seattle, WA (US); Qihui Li, Seattle, WA (US); Nengwu Zhu, Sammamish, WA (US); Bhavesh Anil Doshi, Redmond, WA (US); Joshua Stephen Ullom, Seattle, WA (US); Nathan Manning, Seattle, WA (US); Michael Christopher Wenneman, Seattle, WA (US); Yubai Di, Seattle, WA (US); Hyen Vui Chung, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 15/469,416

(22) Filed: Mar. 24, 2017

(51) Int. Cl.
*H04L 12/24* (2006.01)
*H04L 29/08* (2006.01)
*H04L 29/12* (2006.01)

(52) U.S. Cl.
CPC ...... *H04L 41/0893* (2013.01); *H04L 41/0813* (2013.01); *H04L 61/1511* (2013.01); *H04L 67/1031* (2013.01)

(58) Field of Classification Search
None
See application file for complete search history.

(56) References Cited

U.S. PATENT DOCUMENTS

| | | | | |
|---|---|---|---|---|
| 6,125,420 A * | 9/2000 | Eidson | ............ | H04L 12/18 709/201 |
| 6,256,747 B1 * | 7/2001 | Inohara | ............ | H04L 41/0893 709/201 |
| 7,627,694 B2 * | 12/2009 | Sreenivasan | ............ | H04L 69/40 709/249 |
| 9,832,137 B1 * | 11/2017 | Tan | ............ | H04L 47/78 |
| 2002/0126128 A1 * | 9/2002 | Tsurube | ............ | H04N 1/32101 345/581 |
| 2003/0041138 A1 * | 2/2003 | Kampe | ............ | H04L 41/0893 709/223 |
| 2005/0083834 A1 * | 4/2005 | Dunagan | ............ | G06F 11/0709 370/221 |
| 2011/0026403 A1 * | 2/2011 | Shao | ............ | H04L 67/2895 370/235 |

(Continued)

*Primary Examiner* — Brian Whipple
(74) *Attorney, Agent, or Firm* — Davis Wright Tremaine LLP

(57) ABSTRACT

In large distributed computing environments, application execution may be distributed between a plurality of groups, the plurality of groups containing a set of host computer systems responsible for the execution of one or more operations of the application. Group membership may be determined by generating configuration information based at least in part on the plurality of groups. The configuration information may be provided to a plurality of host computer systems and each host computer system of the plurality of host computer systems may determine membership to a particular group of the plurality of groups based at least in part on the configuration information.

20 Claims, 9 Drawing Sheets

(56) References Cited

U.S. PATENT DOCUMENTS

| | | | |
|---|---|---|---|
| 2012/0158933 A1* | 6/2012 | Shetty | H04L 41/12 |
| | | | 709/223 |
| 2014/0173112 A1* | 6/2014 | Seago | H04L 67/32 |
| | | | 709/226 |
| 2015/0207683 A1* | 7/2015 | Adogla | H04L 41/0893 |
| | | | 709/223 |
| 2016/0294945 A1* | 10/2016 | McIlroy | H04L 25/40 |
| 2017/0171186 A1* | 6/2017 | Purushothaman | H04L 63/083 |
| 2017/0212799 A1* | 7/2017 | Konireddygari | G06F 11/0793 |
| 2017/0214737 A1* | 7/2017 | Agarwal | G06F 9/45558 |

* cited by examiner

MEMBERSHIP SELF-DISCOVERY IN DISTRIBUTED COMPUTING ENVIRONMENTS

BACKGROUND

Companies and individuals seeking to reduce the expense and overhead associated with maintaining their own computing resources have turned instead to purchasing remote computing services, such as remote program execution over multiple virtual machine instances and remote data storage, offered by computing resource service providers to customers. Such remote computing services are often configurable and scalable to meet various computing needs of the customers of the computing resource service provider.

In a large distributed computing system (e.g., multiple distributed data centers) of a computing resource service provider, various customers, users, services, and resources of the computing resource service provider are in frequent communication with each other. Balancing customer access to the computing resources and keeping the system highly available becomes more challenging as the complexity and usage of the system increases. In such distributed computing systems, it can be difficult to isolate and troubleshoot issues within the system, and even when issues are identified, reliably distributing the resources of the system may be challenging. Furthermore, these distributed computing systems may be leveraged to execute large-scale applications or jobs. Along with executing large scale applications or jobs, the computing resources in these environments may be replaced, new hardware may be added, the configuration of the computing resources may be modified, or individual computing resources may fail and need to be replaced. These changes to the distributed computing systems may pose a variety of problems to computing resource service providers.

BRIEF DESCRIPTION OF THE DRAWINGS

Various techniques will be described with reference to the drawings, in which.

DETAILED DESCRIPTION

Figure 1:
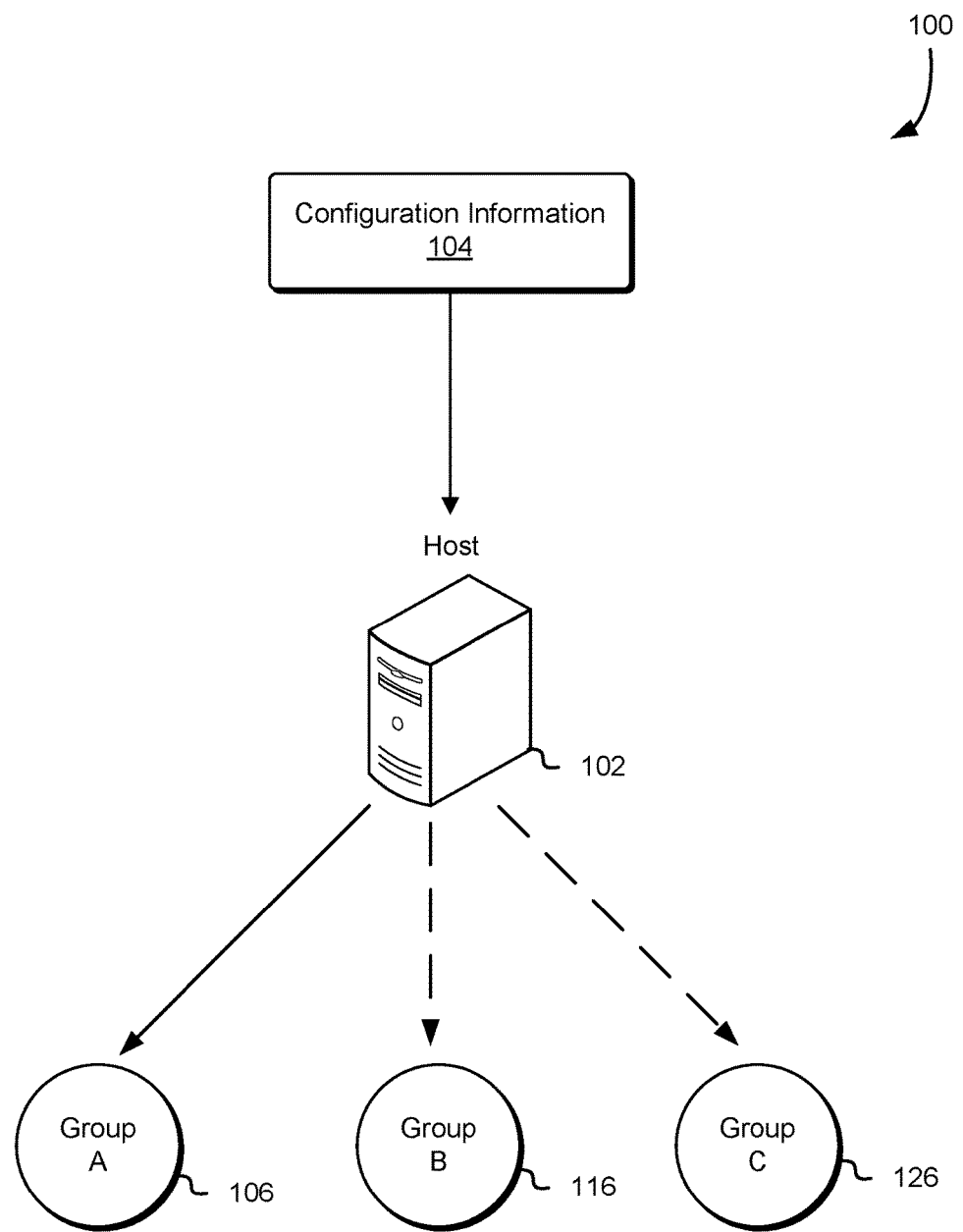
FIG. 1 illustrates an environment in which a host computer system may determine group membership based at least in part on configuration information in accordance with an embodiment.

In various examples described below, configuration information is provided to individual hosts in a distributed computing environment to enable the hosts to determine group membership for execution and/or processing of applications and/or jobs. Traditionally, in distributed computing environments, host membership is assigned and maintained at a centralized location such as a management server. However, this creates a central point of failure as well as a potential bottleneck as a result of multiple hosts communicating with the management host to determine membership information. In addition, central management severs may contain stale data (e.g., membership information that has been modified and is therefore not current and/or incorrect as a result of modifications to the membership information that have been made but not yet propagated to the data available to the central management server). The present disclosure describes various mechanisms enabling self-discovery of group membership for host computer systems that serve to mitigate against such issues.

In one example, host configuration information is provided to a plurality of host computer systems. The host configuration information includes information which is used by the host computer systems to determine group membership. Distributing the hosts between a plurality of groups provides a mechanism to implement divide and conquer algorithms as wells as increasing efficiency of the application executed by the hosts, providing parallel execution of tasks and/or operations of the application, and increasing availability (e.g., if one group fails, other groups are still available to execute the application). For example, the hosts may be distributed among a plurality of groups to process storage requests of a storage application. As described in various embodiments of the present disclosure, the hosts may determine membership information based at least in part on the host configuration information. For example, the host configuration information may include a total number of groups and indicate a value and/or identifier of the host computer systems to hash to determine group membership. Each host computer systems then hashes, using a hashing algorithm, the indicated value and/or identifier and uses the resulting hash value to determine group membership. In one embodiment, a hash ring or other form of consistent hashing is used to ensure that membership is evenly distributed among the groups. The value and/or identifier includes various values such as Internet Protocol (IP) address, Domain Name System (DNS) information, Media Access Control (MAC) address, and/or any other information unique to each host computer system of the plurality of host computer systems such that the hashing of such information results in distributed distribution of hash values hash values among locations in the hash ring or other mechanism.

In various examples described in the present disclosure, a distributed computing environment may include thousands, hundreds of thousands, or more host computer systems. These host computer systems may be separated into groups to process tasks and/or applications. Any application or task that includes operations that may be divided, distributed, and executed by various host computer systems may be processed by a plurality of groups including a plurality of host computer systems. The tasks and/or applications executed by the plurality of groups include web application, storage applications, database applications, batch jobs, processing tasks, or any other operation or combination of operations that can be divided for execution among a plurality of host computer systems. Distribution of the execution of the tasks and/or application provides process isolation and robust execution by ensuring that failure of a particular host computer system does not mean failure of the entire task and/or application. In addition, the use of the various mechanisms for self-discovery of group membership by host computer systems does not preclude the use of a central management system. In other words, a central management system may still be used in connection with various embodiments described herein. In some examples, a central management system may rebalance group membership, determine configuration information, add or create new groups, or provision additional host computer systems for participation in one or more groups.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well known features may be omitted or simplified to avoid obscuring the techniques being described.

FIG. 1 illustrates an environment 100 in which a host computer system 102 may determine group membership based at least in part on configuration information 104 in accordance with an embodiment. During provisioning of the host computer system 102, configuration information 104 may be provided. The configuration information 104 may be provided by a central management server or other computer system or service responsible for provisioning the host computer system 102. In yet other embodiments, the configuration information 104 is provided at a point in time after the host computer system 102 has been provisioned. The configuration information 104 may be encoded as part of the executable instruction provided to the host computer system 102. The configuration information may include any information suitable for enabling the host computer system 102 to determine group membership and/or other membership information. In various embodiments, the configuration information 104 includes only information indicating a number of groups. In the example illustrated in FIG. 1, the configuration information 104 may indicate that the number of groups is three, shown as group 'A' 106, group 'B' 116, and group 'C' 126 in FIG. 1. Although three groups are shown in FIG. 1, the present disclosure may be practiced with any number of groups including, as described in greater detail below, groups containing hierarchical structures. Returning to the embodiment described above, when the configuration information 104 indicates the number of groups, the host computer system 102 divides the hash range by the number of groups and assigns a particular group to each range. The host computer system 102 then hashes information unique to the host computer system 102 and determines membership information based at least in part on the particular group assigned to the range that the result of hashing the unique information is mapped to or otherwise falls within.

In yet other embodiments, the configuration information 104 includes logic and/or executable code that, as a result of being executed by one or more processors of the host computer system 102, causes the host computer system 102 to determine group membership information. For example, the configuration information 104 includes executable instructions that cause the host computer system 102 to obtain information associated with the host computer system 102, generate a hash of the obtained information, and determine group membership based at least in part on a result of hashing the obtained information. An immutable consistent hash ring or other mechanisms for obtaining consistent hashing, such that hashing of information is distributed over the range of possible hash values, can be used to determine group membership based at least in part on a result of hashing. As described above, distinct hash ranges may correspond to respective groups. For example, a hash range in which a hash falls indicates a group to which the host belongs.

Furthermore, hashing provides mechanisms for evenly and randomly distributing host computer systems among the groups. For example, by ensuring that the number of members of group A 106 is approximately equal to the number of members of group B 116 and the number of members of group C 126, as described in the present disclosure, the number of host computer systems may be large enough (e.g., hundreds of thousands) that the number of host computer systems in each group (e.g., group A 106, group B 116, and group C 126) may be considered approximately equal if it is within a certain parentage of the total number of host computer systems, such as plus or minus ten percent. In addition, other distributions of the host computer systems (e.g., a non-even distribution) among the group are considered within the scope of the present disclosure and are described in greater detail below in connection with FIG. 3.

Returning to the example above, the configuration information may include an immutable consistent hash ring used to determine membership information. A consistent hash ring is considered to be immutable when the positions or ranges within the consistent hash ring are fixed such that the hash of a value will always point to the same position or range every time the value is hashed (e.g., the IP address will always point to the same position on the consistent hash ring based at least in part on a hash of the IP address). When there is a change to the host computer systems topology (e.g., software deployments, refilling a pool of software containers, replacing failed software containers, hardware deployments, etc.), a new consistent hash ring may be generated. In addition, when there is a change to the number of groups, a new consistent hash ring may also be generated. In these situations, the configuration information 104 (including the new consistent hash ring) may be redistributed to the plurality of host computer systems and group membership may be re-established.

Information associated with the host computer system such as location, IP address, DNS information, identification number, name, alias, MAC address, or any other host computer system data may be hashed using one or more hash functions. This may provide a unique identifier which may be used to associate and/or determine a group for the host computer systems 102. In addition, the information to be hash may be selected such that membership information may be re-establish or re-set without reference or influence of any previous group membership. For example, using an IP address of the host computer system may ensure that group membership is not fixed during redeployment. Put another way, when a particular host computer system fails and/or is re-provisioned, a new IP address within a particular subnet may be assigned, the new IP address may hash to a new location on the consistent hash ring and therefore may indicated new group membership. In contrast, if the MAC address of the host computer system 102 is used to determine membership, the host computer system will always generated the same hash value because the MAC address of the host computer system remains constant.

In various examples, a message digest hash algorithm (e.g., MD5) is used to hash the unique information of the host computer systems 102 indicated in the configuration information 104, the resulting hash key may be within a particular range associated with a particular group membership. As illustrated in FIG. 1, the group membership is shown as a solid line, the dashed lines indicate possible group membership determined based at least in part on the hash ring as described above. In various embodiments, the configuration information 104 may only indicate that host computer system specific information is to be used to determine membership, and the host computer system may select any host computer system specific information to hash and determine group membership based at least in part on a result of hashing the selected host computer system specific information.

Figure 2:
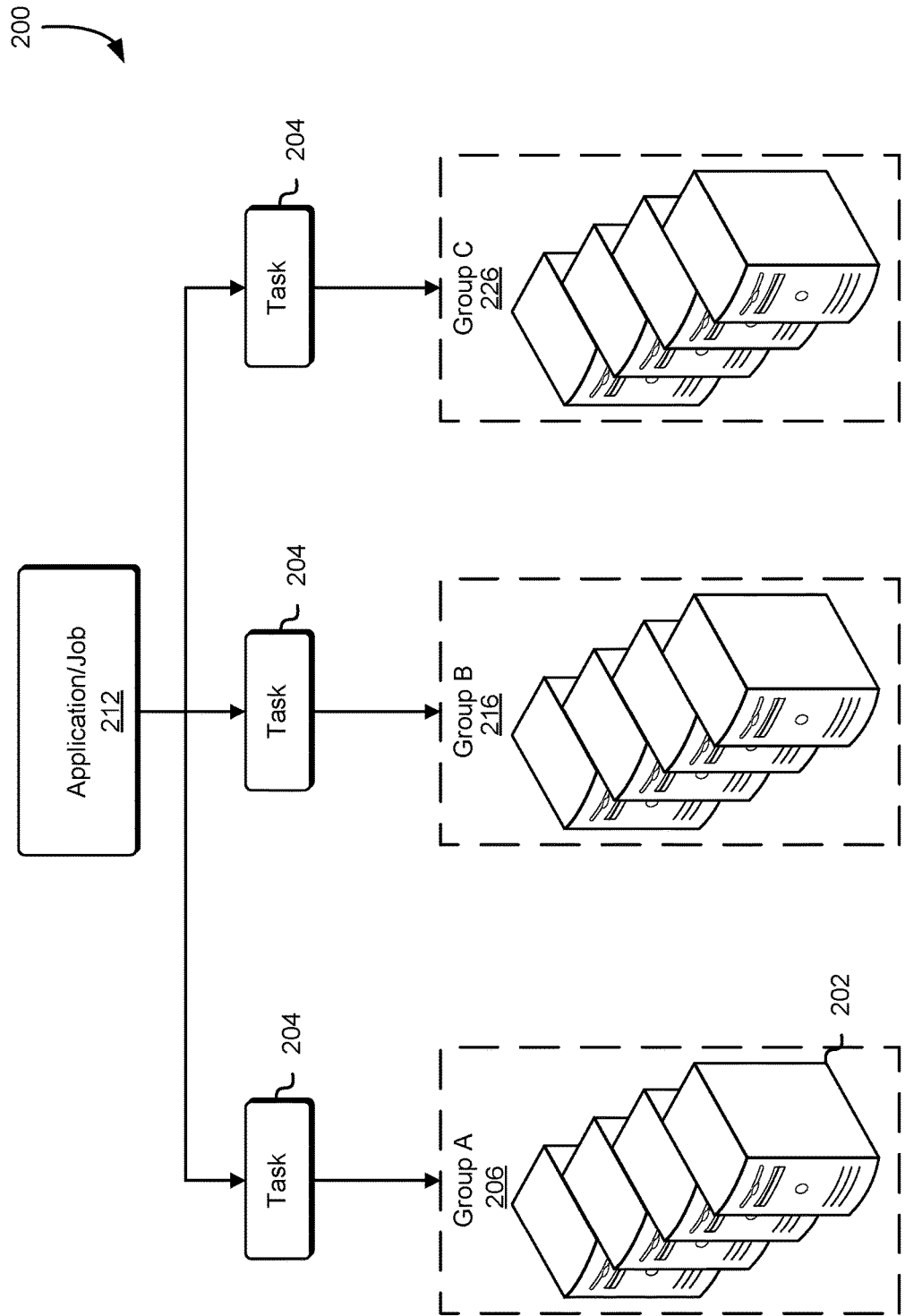
FIG. 2 illustrates an environment in which an application and/or a job may be divided into a set of tasks to be processed by a set of groups containing a plurality of hosts in accordance with an embodiment.

FIG. 2 illustrates an environment 200 in which an application and/or a job 212 may be divided into a set of tasks 204 to be processed by a set of groups, each group of the set of groups containing a plurality of host computer systems 202 in accordance with an embodiment. As illustrated in FIG. 2, a plurality of host computer systems 202 are distributed into three groups group 'A' 206, group 'B' 216, and group 'C' 226. Each host computer system of the plurality of host computer systems 202 may have determined group membership based at least in part on configuration information as described above. In addition, each host computer system of the plurality of host computer systems 202 may be of the same or different type of host computer system. Put another way, the makeup of the groups may be heterogeneous or homogenous so long as each different type of host computer system can process all of the tasks 204 of the application and/or job 212.

The plurality of host computer systems 202 may include one or more computing resources (e.g., physical compute resources, virtual computing resources, and/or distributed computing resources) that execute tasks 204 received via a network address associated with a particular host computer system. Note that the host computer systems could comprise multiple devices (e.g., a combination of physical or virtual devices), such as when the network address corresponds to a load balancer that routes traffic to the plurality of host computer systems 202.

The plurality of host computer systems 202 may be equipped with any needed processing capability, including one or more processors such as a central processing unit, a graphics processing unit, or a digital signal processor. The plurality of host computer systems 202 may also be equipped with memory (e.g., static and dynamic memory), buses, and input and output ports that are compliant with any handshaking, communications or data transfer protocol. The plurality of host computer systems 202 may also include or be provided access to storage devices, such as storage disks and tapes, and networking equipment. The storage devices may be network storage devices managed by a data storage service. In addition, the plurality of host computer systems 202 may be provided by a computing resource service provider.

The plurality of host computer systems 202 provided by the computing resource service provider may include computing resources obtained from a virtual computer system service, a block-level data storage service, a cryptography service, an on-demand data storage service, a notification service, an authentication system, a policy management service, a task service, or one or more other services provided by the computing resource service provider. It is noted that not all embodiments described include the services described above, and additional services may be provided in addition to or as an alternative to services explicitly described. Furthermore, the computing resources of the various services may communicate with other computing resources of the computing resource service provider, customers, or other services through a network whereby the network may be a communication network, such as the Internet, an intranet or an Internet service provider (ISP) network.

Returning to FIG. 2, the application and/or job 212 is split into tasks 204 to be executed by the groups. Each task 204 may be the same or different tasks. In one example, each task may an indexing task for a data storage service. In another example, a first portion of the tasks 204 are load balancing tasks and a second portion of the tasks 204 are web application tasks. In this manner, different operations of the application and/or job 212 may be completed by different groups. Each group and the plurality of host computer systems 202 in each group may be geographically or logically distributed. For example, the plurality of host computer systems 202 may be geographically distributed among various of data centers. In addition, the plurality of host computer systems 202 may be distributed across logical groupings of computing resources such as fault zones. In various embodiments, a routing service may route tasks 204 to particular groups and/or host computer systems associated with particular groups. In yet other embodiments, the configuration information may include logic and/or executable code that enables the host computer systems to obtain tasks 204 once group membership is determined. For example, the configuration information may include a location of an application to be executed by the host computer systems depending on what group the host computer system is a member of.

Figure 3:
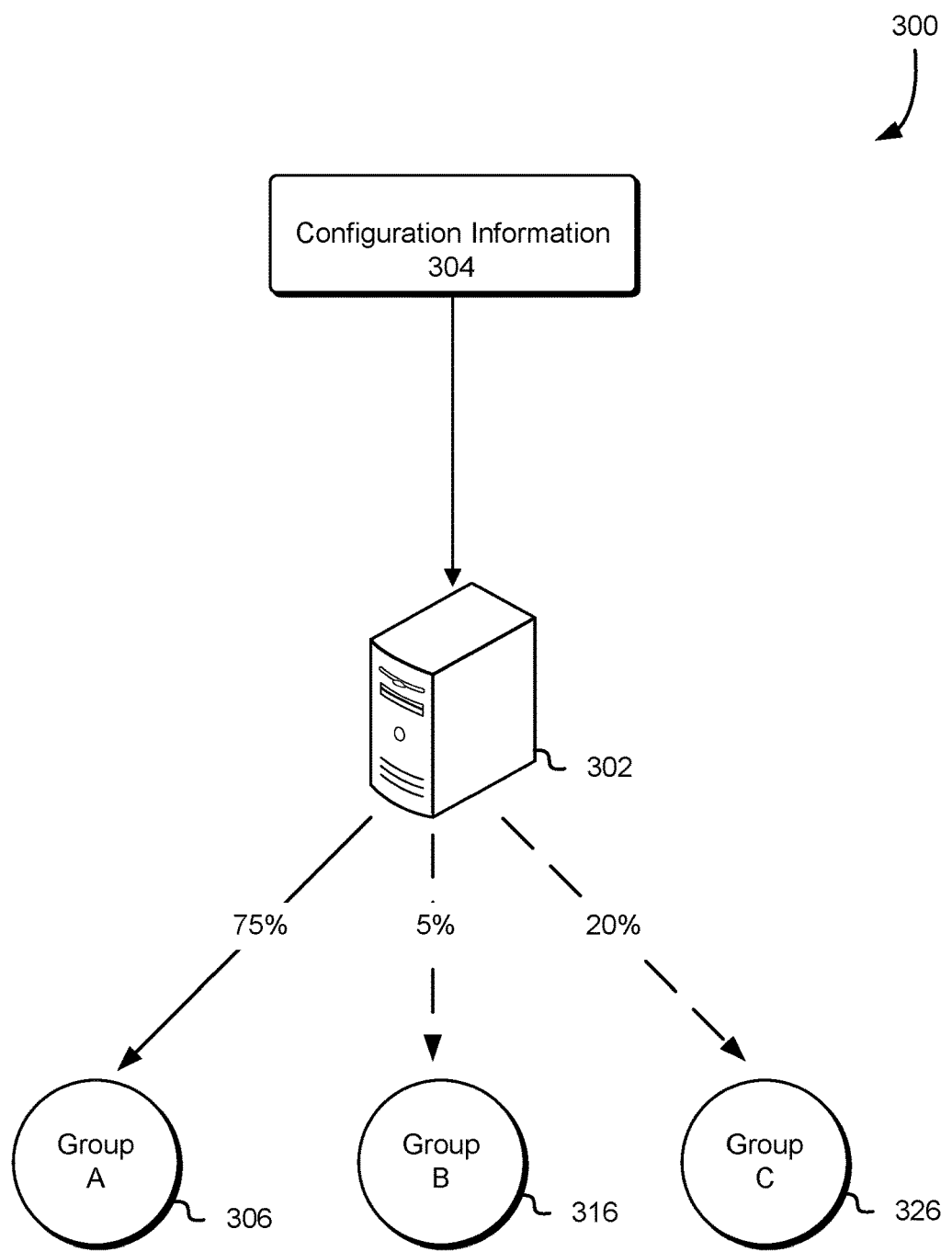
FIG. 3 illustrates an environment in which a host computer system may determine group membership based at least in part on configuration information in accordance with an embodiment.

FIG. 3 illustrates an environment 300 in which a host computer system 302 may determine group membership based at least in part on configuration information 304 in accordance with an embodiment. During provisioning of the host computer system 302, configuration information 304 may be provided. The configuration information 304 may be provided by a central management server or other computer system or service responsible for provisioning the host computer system 302. In yet other embodiments, the configuration information 304 is provided at a point in time after the host computer system 302 has been provisioned. The configuration information may include any information suitable for enabling the host computer system 302 to determine group membership and/or other membership information. In various embodiments, the configuration information 304 includes only information indicating a number of groups. In the example illustrated in FIG. 3, the configuration information 304 may indicate that the number of groups is three, shown as group 'A' 306, group 'B' 316, and group 'C' 326 in FIG. 3. Although three groups are shown in FIG. 3, the present disclosure may be practiced with any number of groups including, as described in greater detail below, groups containing hierarchical structures.

In addition, for some application and/or jobs to be executed by the host computer system 302, it may be advantageous to have a specific distribution of host computer systems to groups and/or imbalanced group distribution. These distributions may be considered non-uniform distributions for the purposes of the present disclosure. For example, as discussed above, when executing a web application or web service, it may be advantageous to have a certain percentage of host computer systems executing a load balancer application (e.g., 20% of the total number of host computer systems available to execute the load balancer) and the remaining host computer systems executing the web application itself (e.g., the web site and/or web service front-end of the application). As described in the greater detail below, non-uniform distributions may be achieved using a variety of different methods.

The distribution information is illustrated as percentage values in FIG. 3. Each value represents the distribution of available host computer systems to each group. For example, group A contains 75 percent of the total number of available host computer systems to execute the application and/or job. Although, percentages of distribution are shown in FIG. 3, other mechanisms for assigned unbalanced group membership are considered within the scope of the present disclosure. For example, unbalanced distribution may be obtained by assigning a weight or probability to particular groups. In such embodiments, the host computer system 302 may modify the group membership determined based at least in part on the configuration information based at least in part on the probabilities assigned to one or more groups of the set of groups. In other words, after determining group membership based at least in part on a hash of host computer system information, the host computer system may change group membership based at least in part on a probability or other information. This additional information may be included in the configuration information 304 or may be obtained separate from the configuration information.

Figure 4:
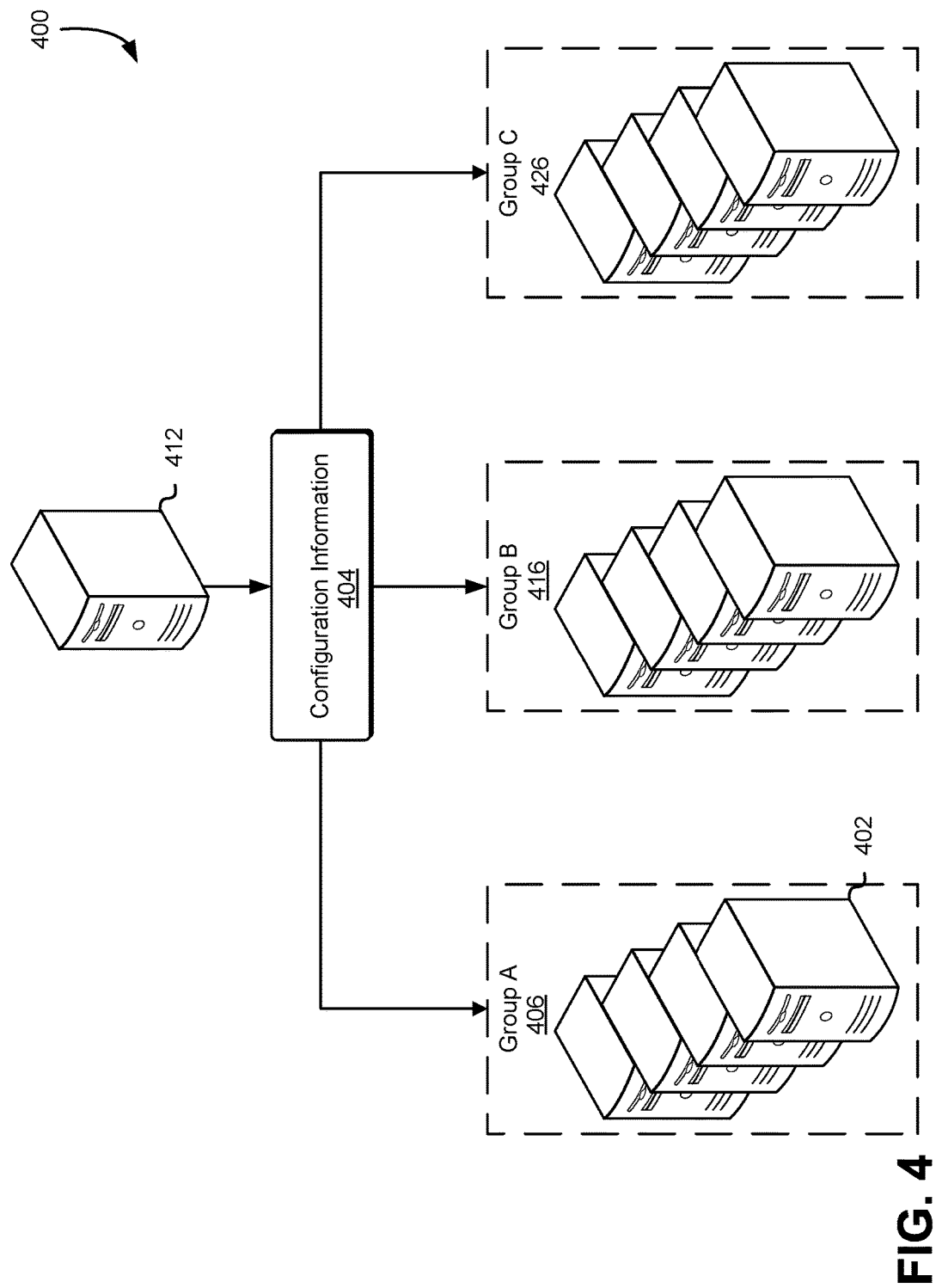
FIG. 4 illustrates an environment in which a server computer system may modify group membership based at least in part on configuration information in accordance with an embodiment.

FIG. 4 illustrates an environment 400 in which configuration information 404 may be provided to a set of groups, each group of the set of groups containing a plurality of host computer systems 402 in accordance with an embodiment. As illustrated in FIG. 4, the plurality of host computer systems 202 are distributed into three groups group 'A' 406, group 'B' 416, and group 'C' 426. Each host computer system of the plurality of host computer systems 202 may have determined group membership based at least in part on configuration information that has been previous provided or may have yet to determine group membership based at least in part on the configuration information 404. In addition, each host computer system of the plurality of host computer systems 402 may be of the same or different type of host computer system. In an embodiment, a central management server 412 generates the configuration information 404. The configuration information 404 may be used to rebalance or redistribute host computer systems of the plurality of host computer systems among a subset of groups of the set of groups. In yet other embodiments, the configuration information 404 may be provided to a set of newly provisioned host computer systems to be added to at least one group of the set of groups.

Although the configuration information 404, as illustrated in FIG. 4, is distributed to host computer systems in each group of the set of groups, in some embodiments the configuration information 404 is distributed to a subset of groups of the set of groups. For example, in one embodiment, the configuration information 404 is provided only to the plurality of host computer systems 402 of group A to redistribute the membership of group A to at least one other group. The plurality of host computer systems 402 may include one or more computing resources (e.g., physical compute resources, virtual computing resources, and/or distributed computing resources) that execute tasks received via a network address associated with a particular host computer system. Note that the host computer systems could comprise multiple devices (e.g., a combination of physical or virtual devices), such as when the network address corresponds to a load balancer that routes traffic to the plurality of host computer systems 402.

The plurality of host computer systems 402 may be equipped with any needed processing capability, including one or more processors such as a central processing unit, a graphics processing unit, or a digital signal processor. The plurality of host computer systems 402 may also be equipped with memory (e.g., static and dynamic memory), buses, and input and output ports that are compliant with any handshaking, communications or data transfer protocol. The plurality of host computer systems 402 may also include or be provided access to storage devices, such as storage disks and tapes, and networking equipment. The storage devices may be network storage devices managed by a data storage service. In addition, the plurality of host computer systems 402 may be provided by a computing resource service provider.

The plurality of host computer systems 402 provided by the computing resource service provider may include computing resources obtained from a virtual computer system service, a block-level data storage service, a cryptography service, an on-demand data storage service, a notification service, an authentication system, a policy management service, a task service, or one or more other services provided by the computing resource service provider. It is noted that not all embodiments described include the services described above, and additional services may be provided in addition to or as an alternative to services explicitly described. Furthermore, the computing resources of the various services may communicate with other computing resources of the computing resource service provider, customers, or other services through a network whereby the network may be a communication network, such as the Internet, an intranet or an Internet service provider (ISP) network.

Returning to FIG. 4, the embodiments illustrated by FIG. 4 include embodiments where a hybrid mechanism is employed to determine group membership. For example, the central management server 412 may provide configuration information 404 to rebalance the set of groups at a point in time after each host computer system of the plurality of host computer systems 402 has previously determined membership information. To put another way, the set of groups may at some point become unbalanced or may require redistribution for various reasons (e.g., host computer system failure, data or host migration, software deployments, hardware upgrades, increasing or decreasing capacity, or modification of the application and/or job executed by the host computer systems), and the central management server 412 may then generate new configuration information 404 to redistribute the plurality of host computer systems 402.

The configuration information 404, in some embodiments, simply assigns a particular host computer system to a particular group. In such embodiments, the configuration information may override the membership information determined by the particular host computer systems. In yet other embodiments, the configuration information 404 includes information to enable the plurality of host computer systems to determine membership information as described above. Furthermore, the central management server 412 may be included in any of the embodiments described in the present disclosure. For example, the central management server 412 may responsible for provisioning the host computer systems and providing the configuration information to the host computer systems as described herein.

In another example, the configuration information 404 may only include the total number of groups. As described above, in such situations, the host computer systems determine group membership based at least in part on the configuration information 404; for example, by hashing information unique to the host computer system and determining a group based at least in part on the result. The groups may also be represented by an identifier or token; for example, each group may have a group identifier unique to the set of groups. In addition, this group identifier may be hashed and the hash may be maintained in a database. The database may be maintained by the central management server 412 or may be maintained by a service of the computing resource service provider. Furthermore, the database may be scalable (e.g., the amount of computing resources accessible to the database can be increased or decreased) to allow for the addition of groups and/or host computer systems.

In some embodiments where a database is used to track group identification information (e.g., group identifier), the database maintains a mapping of values to group identification information. The host computer systems may then determine a value, for example, by generating a hash of information unique to the host computer systems, the host computer systems may then query the database based at least in part on the value to determine membership information. Alternatively, the host computer systems may simply randomly or pseudorandomly select a number between 1 and n, where n is the number of groups, and query the database based at least in part on the selected number to determine membership information. The database may maintain a mapping of numbers to groups and may return a group identifier based at least in part on the number received from the host. In such embodiments, when an additional group is added, the database may be updated and the configuration information 404 may be provided to the plurality of host computer systems 402 to redistribute the plurality of host computer systems among the groups, including the newly added group. In such embodiments, having a database maintain a portion of the membership information and/or additional membership information reduces the amount of information required in the configuration information and in turn the amount of information provided to and/or maintained by the host computer systems 402.

Figure 5:
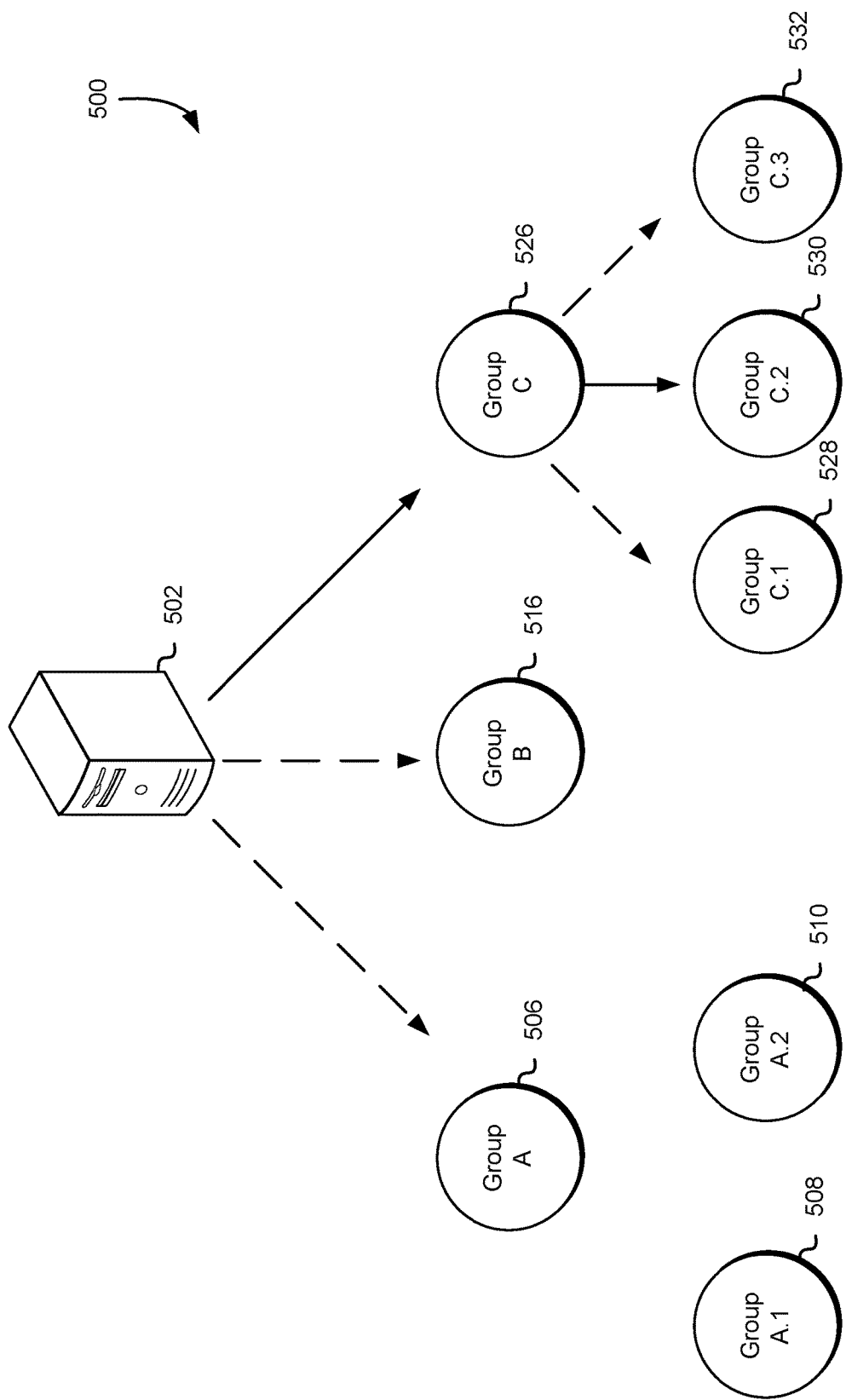
FIG. 5 illustrates an environment in which a host computer system may determine group membership based at least in part on configuration information in accordance with an embodiment.

FIG. 5 illustrates an environment 500 in which a host computer system 502 may determine group membership based at least in part on configuration information in accordance with an embodiment. During provisioning of the host computer system 502, configuration information may be provided. The configuration information may be provided by a central management server, as described above, or other computer system or service responsible for provisioning the host computer system 502. In yet other embodiments, the configuration information is provided at a point in time after the host computer system 502 has been provisioned. The configuration information may include any information suitable for enabling the host computer system 502 to determine group membership and/or other membership information. In the example illustrated in FIG. 5, the configuration information indicates a hierarchical structure within the group, shown as group 'A' 506 with sub-groups 'A.1' 508 and 'A.2' 510, group 'B' 516 with no sub groups, and group 'C' 526 with sub-groups 'C.1' 528, 'C.2' 530, and 'C.3' 532. Although three groups and five sub-groups are shown in FIG. 5, the present disclosure may be practiced with any number of groups and sub-groups. In addition, while the groups and sub-groups illustrated in FIG. 5 are shown in a tree structure, any organization of groups and sub-groups may be used in accordance with the present disclosure.

In addition, for some applications and/or jobs to be executed by the host computer system 502, it may be advantageous to have a hierarchical structure of the set of groups. For example, a hierarchical group structure may allow for multiple subsystems or indexing systems within the same application and/or job. The host computer system 502 may traverse a decision tree or other data structure to determine membership information. At each level of the group hierarchy the host computer system 502 may make a decision as to which group or sub-group to join. Similar, as described above, the decision may be made based at least in part on a hash value generated by the host computer systems 502. In some embodiments, the hash value maps to a range on a consistent hash ring which indicates a group and/or sub-group for the host computer systems to join. In other embodiments, the host computer systems may query a database including the hash value or other value determined by the host computer system 502 to determine a group and/or sub-group for the host computer systems to join.

Figure 6:
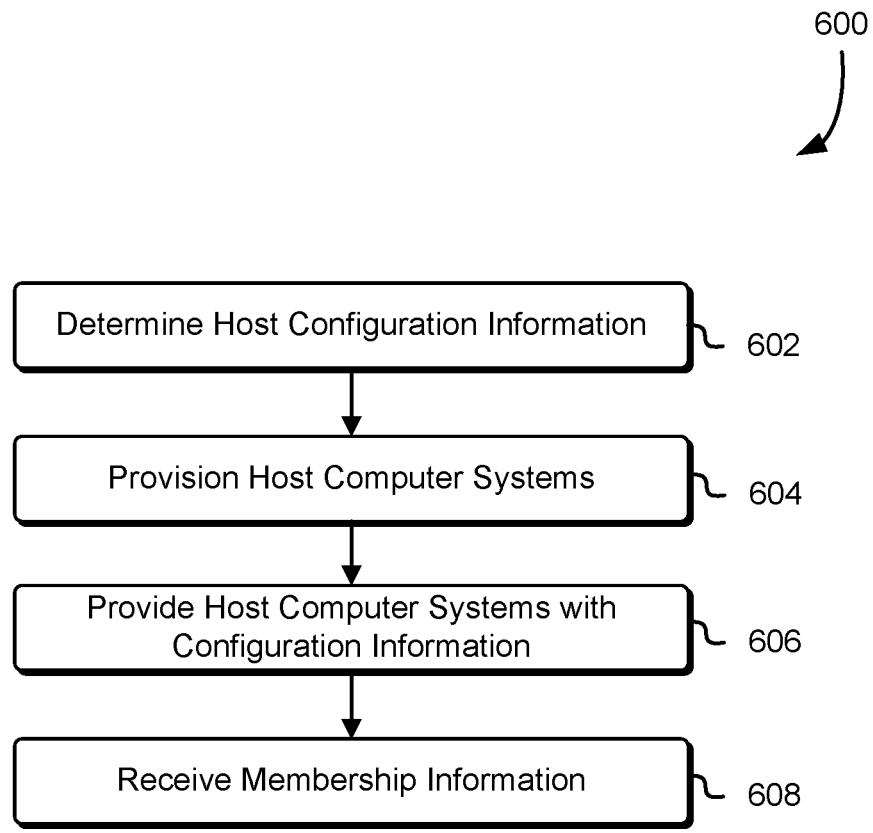
FIG. 6 shows an illustrative process which may be used to generate configuration information in accordance with an embodiment.

FIG. 6 is a block diagram illustrating an example of a process 600 for providing configuration information to a plurality of host computer systems in accordance with at least one embodiment. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system, such as a server in a data center, by various components of the environment 400 described in conjunction with FIG. 4, such as the central management server 412, by multiple computing devices in a distributed system of a computing resource service provider, or by a service provided by a computing resource service provider. The process 600 includes a series of operations where group membership is established for a plurality of host computer systems to execute an application and/or job. For example, the process 600 includes determining host configuration information 602. As described above, the system or service provisioning host computer systems may determine the configuration information based at least in part on the number of groups and/or the application and/or job to be executed by the plurality of host.

As described above, the configuration information may include a total number of groups and/or sub-groups, a consistent hash ring, a decision tree or other data structure, group identifiers, and/or executable code or other instructions containing information to enable the host computer system to determine group membership. The system executing the process 600 may then provision a plurality of host computer systems 604. The host computer systems may be provisioned by a virtual computer system service provided by a computing resource service provider. Other suitable means for provisioning host computer systems may be used in accordance with the present disclosure. Once the host computer systems are provisioned, the systems executing the process 600 may provide the host computer systems with the configuration information 606. The configuration information may be provided to network addresses associated with the host computer systems.

Once the configuration information has been provided, the host computer systems may determine membership information based at least in part on the configuration information. As a result, the system executing the process 600 may receive membership information from the host computer systems 608. The membership information may include information indicating the group joined by a particular host. In addition, the membership information may be used to distribute tasks to the plurality of host computer systems as described above in connection with FIG. 2.

Note that one or more of the operations performed in 602-608 may be performed in various orders and combinations, including in parallel. For example, the system executing the process 600 may provide the configuration information in parallel with provisioning the host computer systems. In numerous variations to the process 600, one or more of the operations 602-608 may be omitted or performed by other systems of services. For example, the host computer systems may already be provisioned and step 604 may be omitted from the process 600. In another example, membership information may be provided to a routing service or a database and not received by the system executing the process 600.

Figure 7:
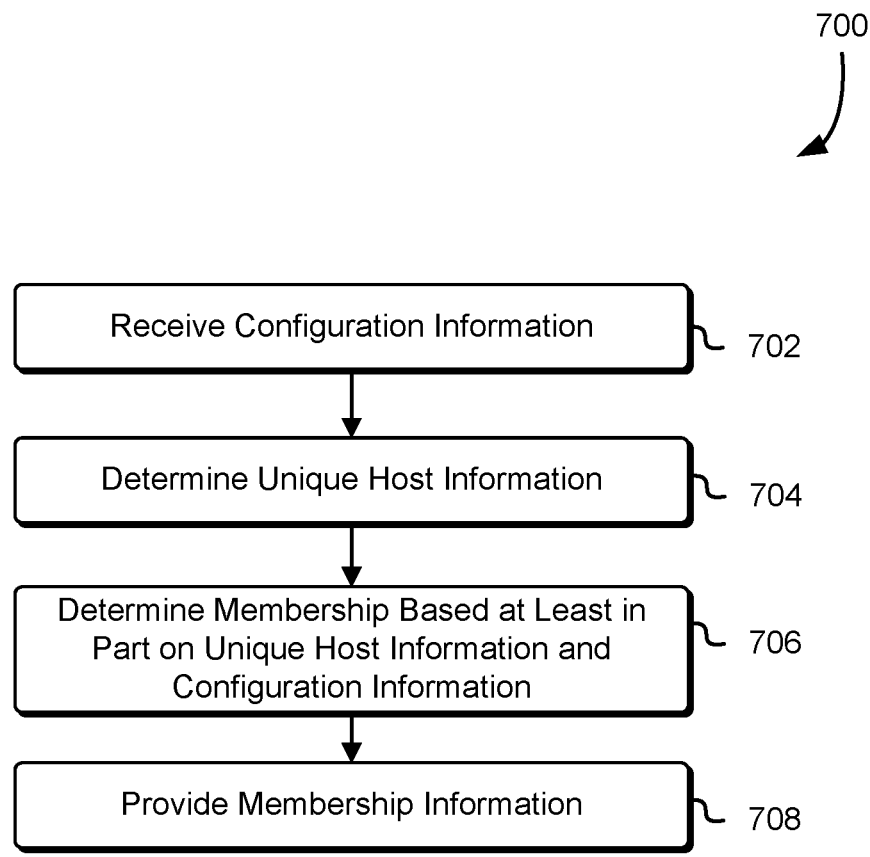
FIG. 7 shows an illustrative process which may be used to receive configuration information in accordance with an embodiment.

FIG. 7 is a block diagram illustrating an example of a process 700 for determining membership information of a particular host computer system in accordance with at least one embodiment. Some or all of the process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the environment described in conjunction with FIGS. 1, 3, and 5, such as the host computer system, by multiple computing devices in a distributed system of a computing resource service provider, or by a service provided by a computing resource service provider. The process 700 includes a series of operations where group membership is determined by a particular host computer system. For example, the process 700 includes receiving configuration information. The configuration information may include various elements described in greater detail above. In addition, the configuration information may include logic or other executable instructions that execute various operations of the process 700 (e.g., determining membership information).

The host computer system may then determine unique host information 704. The unique host information may include any information that is unique to the host computer system relative to the plurality of host computer systems as described above. For example, the unique host information may include an IP address of the host computer system or other networking information. As described above, the configuration information may enable host computer systems to select different unique host information. For example, a first host computer system may select an IP address as the unique host information and a second host computer system may select a MAC address as the unique host information.

Returning to FIG. 7, the host computer system may then determine membership information based at least in part on the unique host information and the configuration information 706. For example, the host computer system generates a hash value by hashing the IP address and compares the hash value with a consistent hash ring included in the configuration information, where the hash ring maps particular ranges to particular groups to determine membership. In another example, the host computer system may provide the hash value to a database in a query which responds to the query with a group identifier that the host computer system uses to determine membership. Other mechanisms described above can be used in connection with process 700 to determine membership information.

Once group membership has been determined by the host computer system, the host computer may provide membership information 708. The membership information may be provided to a database, a central management service, a routing service, or other computer system or service as described above. Note that one or more of the operations performed in 702-708 may be performed in various orders and combinations, including in parallel. For example, the host computer system executing the process 700 may determine membership in parallel with determining the unique host information. In numerous variations to the process 600, one or more of the operations 602-608 may be omitted or performed by other systems of services. For example, the host computer system may simply select a number between 1 and n, where n is the number of groups, as described above in connection with FIG. 4.

Figure 8:
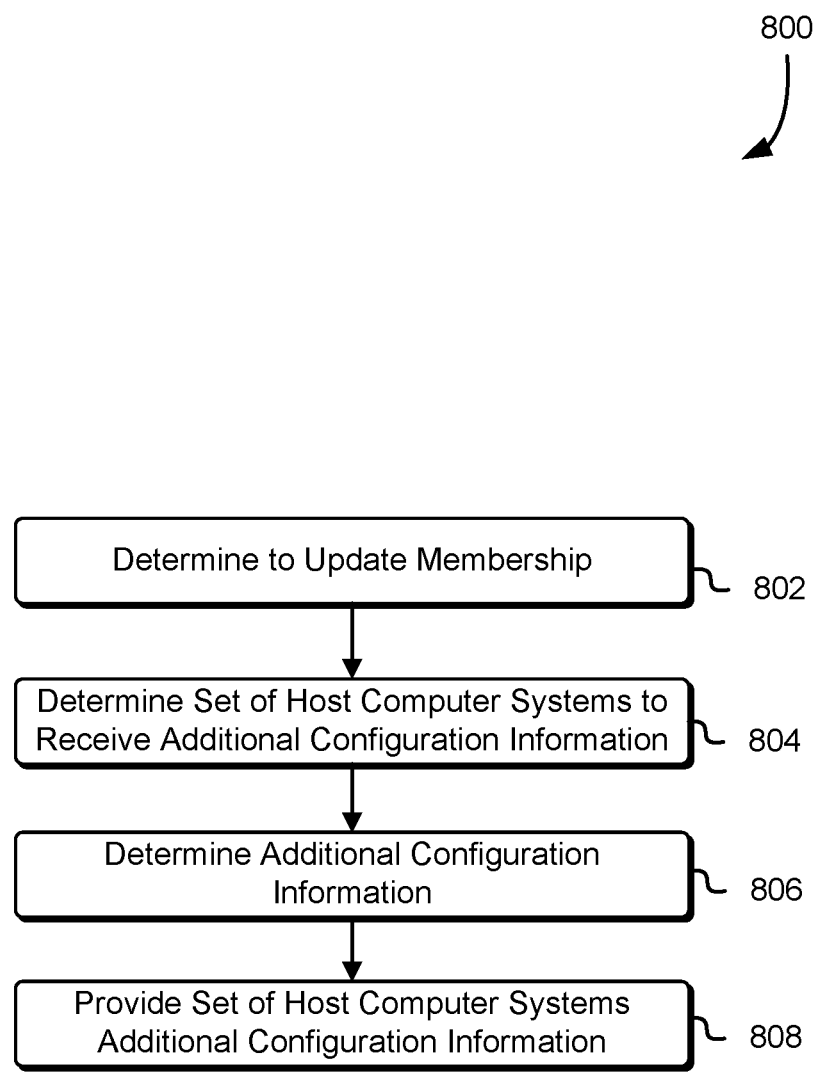
FIG. 8 shows an illustrative process which may be used to update membership information in accordance with an embodiment.

FIG. 8 is a block diagram illustrating an example of a process 800 for updating membership information for a plurality of host computer systems distributed among a plurality of groups in accordance with at least one embodiment. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as a server in a data center, by various components of the environment 400 described in conjunction with FIG. 4, such as the central management service 412, by multiple computing devices in a distributed system of a computing resource service provider, or by a service provided by a computing resource service provider. The process 800 includes a series of operations where group membership is redistributed based at least in part on configuration information. For example, the process 800 includes determining to update membership of at least one group of a set of groups 802. As describe above, membership of the set of groups may become unbalanced or may other require redistribution. The central management server or other system or service may monitor membership of the group to determine if the host computer systems are to be redistributed among the groups. In yet other embodiments, the addition of a new group to the set of groups requires redistribution of the plurality of host computer systems among the groups.

The system executing the process 800 may then determine a set of host computer systems to receive additional configuration information 804. The set of host computer systems may include any of the plurality of host computer systems. Any mechanism for selecting the set of host computer systems may be used in accordance with the present disclosure. For example, the set of host computer systems may be selected based at least in part on geographic region, logical grouping, at random or pseudorandom, or any other mechanism that determines a number of host computer systems to redistribute among the set of groups. The system executing the process 800 may then determine additional configuration information 806. The additional configuration information may include any of the configuration information described above. For example, the additional configuration information may indicate a particular group or group identifier to which a particular host computer system is being assigned or redistributed.

The system executing the process 800 may then provide the set of host computer systems with the additional configuration information 808. As described above, the additional configuration information may be provided to network addresses associated with particular host computer systems of the set of host computer systems. Note that one or more of the operations performed in 802-808 may be performed in various orders and combinations, including in parallel.

Figure 9:
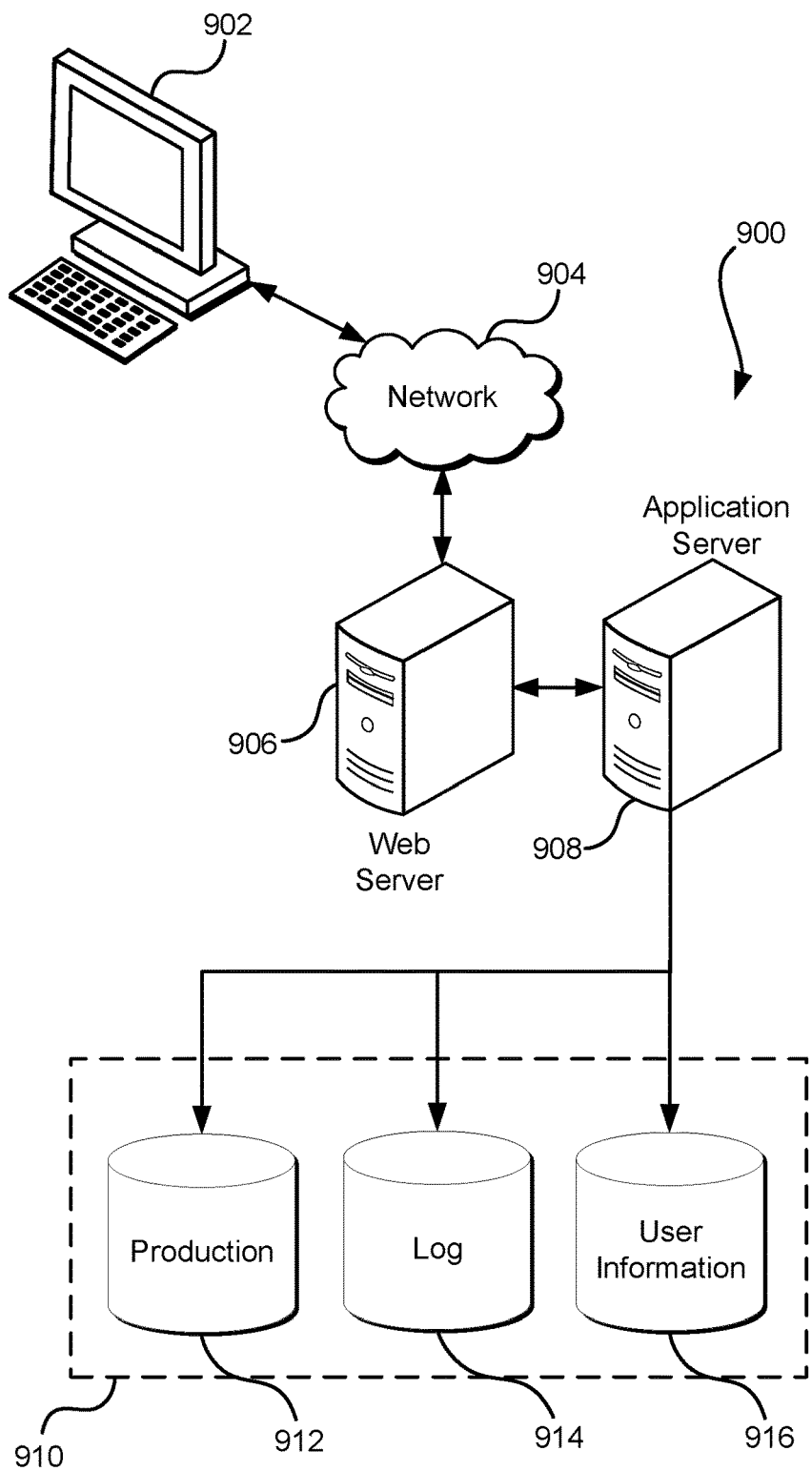
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining application information indicating a set of host computer systems to be provisioned to execute an application;
   determining a set of groups, at least one group of the set of groups to be assigned at least one host computer system of the set of host computer systems;
   generating configuration information based at least in part on the set of groups and host information associated with the set of host computer systems; and
   providing the configuration information to the set of host computer systems to cause a subset of host computer systems of the set of host computer systems to self-determine respective group membership in the set of groups based at least in part on the configuration information.

2. The computer-implemented method of claim 1, wherein the host information further includes network information obtained from a Domain Name System (DNS).

3. The computer-implemented method of claim 1, wherein the respective group membership is self-determined based at least in part on application of a hash function to at least a portion of the host information.

4. The computer-implemented method of claim 1, wherein the configuration information indicates a total number of groups in the set of groups; and
   wherein causing a subset of host computer systems of the set of host computer systems to self-determine membership further includes querying a database to obtain a group identifier based at least in part on a value between 1 and the total number of groups.

5. A system, comprising:
   one or more processors; and
   memory that stores computer-executable instructions that, upon execution, cause the one or more processors to:
   generate configuration information for a plurality of groups, each group of the plurality of groups to contain a set of host computer systems to implement an application; and
   provide the configuration information to a plurality of host computer systems, the configuration information causing each host computer system of the plurality of host computer systems to self-determine membership to a group of the plurality of groups based at least in part on the configuration information.

6. The system of claim 5, wherein the configuration information further includes executable code that is executed by each host computer system of the plurality of host computer systems.

7. The system of claim 5, wherein the plurality of groups are organized in a hierarchical structure.

8. The system of claim 5, wherein the configuration information further includes a numerical value of the plurality of groups.

9. The system of claim 5, wherein the configuration information further includes information that determines a location on a consistent hash function, where a particular range within the consistent hash function indicates a particular group of the plurality of groups.

10. The system of claim 5, wherein the memory further includes computer-executable instructions that, if executed, cause the one or more processors to:
    determine a subset of host computer systems of the set of host computer systems associated with a particular group of the plurality of groups; and
    determine to redistribute the subset of host computer systems based at least in part on a numerical value of set of host computer systems.

11. The system of claim 5, wherein the configuration information causes the plurality of host computer systems to be evenly distributed between the plurality of groups.

12. The system of claim 5, wherein the configuration information causes the plurality of host computer systems to be distributed between the plurality of groups in accordance with a non-uniform distribution.

13. A set of non-transitory computer-readable storage media comprising executable instructions that, upon execution by one or more processors of a computer system, cause the computer system to:
    determine a plurality of groups associated with an application;
    provision a plurality of hosts to execute a set of tasks of the application by at least:
    generating configuration information based at least in part on the plurality of groups and the application; and
    providing the configuration information to the plurality of hosts; and
    self-determine membership information for the plurality of groups based at least in part on the configuration information provided to the plurality of hosts.

14. The set of non-transitory computer-readable storage media of claim 13, wherein the executable instructions that cause the computer system to self-determine membership information for the plurality of groups further include instructions that cause the computer system to self-determine, by each host of the plurality of hosts, membership information by at least processing the configuration information.

15. The set of non-transitory computer-readable storage media of claim 14, wherein the instructions that cause the computer system to process the configuration information further include instructions that cause the computer system to generate a first hash of information unique to a first host processing the configuration information.

16. The set of non-transitory computer-readable storage media of claim 15, wherein the instructions that cause the computer system to process the configuration information further include instructions that cause the computer system to generate a second hash of information unique to a second host processing the configuration information, where the information unique to the first host is of a different category than the information unique to the second host.

17. The set of non-transitory computer-readable storage media of claim 13, wherein the plurality of groups further includes a hierarchical structure.

18. The set of non-transitory computer-readable storage media of claim 17, wherein the executable instructions that cause the computer system to self-determine membership information for the plurality of groups further include instructions that cause the computer system to self-determine, by each host of the plurality of hosts, membership information by at least processing a decision tree.

19. The set of non-transitory computer-readable storage media of claim 13, wherein the configuration information further includes a probability associated with each group of the plurality of groups, where the probability modifies a membership determination made by at least one host of the plurality of hosts.

20. The set of non-transitory computer-readable storage media of claim 13, wherein the executable instructions further comprise instructions that, as a result of being executed by the one or more processors, cause the computer system to:
   add an additional group to the plurality of groups to generate a new plurality of groups; and
   redistribute the plurality of hosts to the new plurality of groups by at least:
      generating new configuration information based at least in part on the new plurality of groups; and
      providing the new configuration information to the plurality of hosts.

\* \* \* \* \*